UNITED STATES PATENT OFFICE.

ELMO H. WYKOFF AND GEORGE R. RISHEL, OF ALEXANDRIA, PENNSYLVANIA.

PAINT.

No. 869,123.  Specification of Letters Patent.  Patented Oct. 22, 1907.

Application filed February 16, 1907. Serial No. 357,610.

*To all whom it may concern:*

Be it known that we, ELMO H. WYKOFF and GEORGE R. RISHEL, citizens of the United States, residing at Alexandria, in the county of Huntingdon and State of Pennsylvania, have invented certain new and useful Improvements in Paints, of which the following is a specification.

This invention provides a paint especially adapted for submarine work and iron and wooden piers, docks, ships and boat bottoms in salt or fresh water. The paint when applied prevents erosive action of the material to which applied whether located in salt or fresh water.

In preparing the paint, the following ingredients are combined by weight in the proportions substantially as specified, viz: Linseed oil, four parts. Rubber (any waste black, not white) two parts. Sulfur, one part. Alum (powdered) one-half part.

The linseed oil serves as a vehicle for the other ingredients. The rubber gives body and elasticity to the paint. The alum and sulfur render the paint a preservative against the inroads of marine insects when said paint is applied to docks, piers, boat bottoms and the like.

In preparing the paint, the linseed oil is heated to the boiling point after which the rubber is gradually added thereto, the whole being constantly stirred until the rubber is melted, after which the sulfur is gradually added and stirred into the mass of oil and rubber. Next the alum is gradually added and stirred in, care being observed to prevent boiling over of the mixture. Prior to adding the alum, it is preferable that the mixture of linseed oil, rubber and sulfur be allowed to cool. After the alum has been stirred into the mixture, the whole is boiled until it assumes the consistency of syrup, after which it is set aside to cool and placed in packages which are sealed.

A paint such as herein described may be applied under water by means of a brush and will adhere to the surface to which it may be applied and will not wash off.

The paint besides preserving the material from erosive action, also prevents the work being attacked by insects which are destructive to wooden structures.

Having thus described the invention, what is claimed as new is:

The herein described paint consisting of linseed oil, rubber, sulfur and alum combined substantially as specified in about the proportions set forth.

In testimony whereof we affix our signatures in presence of two witnesses.

ELMO H. WYKOFF. [L. S.]
GEORGE R. RISHEL. [L. S.]

Witnesses:
W. M. HENDERSON,
ALICE E. WEBER.